United States Patent
Sun et al.

(10) Patent No.: US 11,643,581 B2
(45) Date of Patent: May 9, 2023

(54) TWO-COMPONENT POLYURETHANE ADHESIVE COMPOSITION AND BONDING METHOD THEREOF

(71) Applicants: HANGZHOU ZHIJIANG NEW MATERIAL CO., LTD, Hangzhou (CN); HANGZHOU ZHIJIANG SILICONE CHEMICALS CO., LTD., Hangzhou (CN)

(72) Inventors: Hui Sun, Hangzhou (CN); Xiaole Tao, Hangzhou (CN); Yunlong Li, Hangzhou (CN); Yongfu He, Hangzhou (CN)

(73) Assignees: HANGZHOU ZHIJIANG NEW MATERIAL CO., LTD, Hangzhou (CN); HANGZHOU ZHIJIANG SILICONE CHEMICALS CO., LTD., Hangzhou (CN)

( * ) Notice: Subject to any disclaimer, the term of this patent is extended or adjusted under 35 U.S.C. 154(b) by 183 days.

(21) Appl. No.: 16/753,257

(22) PCT Filed: Dec. 4, 2019

(86) PCT No.: PCT/CN2019/122996
§ 371 (c)(1),
(2) Date: Apr. 2, 2020

(87) PCT Pub. No.: WO2021/109025
PCT Pub. Date: Jun. 10, 2021

(65) Prior Publication Data
US 2021/0340416 A1    Nov. 4, 2021

(51) Int. Cl.
| | | |
|---|---|---|
| *C09J 175/08* | (2006.01) | |
| *C09J 175/06* | (2006.01) | |
| *C08G 18/10* | (2006.01) | |
| *C08K 3/013* | (2018.01) | |
| *C08G 18/12* | (2006.01) | |
| *C08G 18/32* | (2006.01) | |
| *C08G 18/42* | (2006.01) | |
| *C08G 18/50* | (2006.01) | |
| *C08G 18/80* | (2006.01) | |

(52) U.S. Cl.
CPC ............ *C09J 175/08* (2013.01); *C08G 18/10* (2013.01); *C08G 18/12* (2013.01); *C08G 18/3206* (2013.01); *C08G 18/4238* (2013.01); *C08G 18/5024* (2013.01); *C08G 18/80* (2013.01); *C08K 3/013* (2018.01); *C09J 175/06* (2013.01); *C08K 2201/005* (2013.01); *C08K 2201/011* (2013.01)

(58) Field of Classification Search
CPC ....... C09J 175/08; C09J 175/06; C08G 18/10; C08G 18/12; C08G 18/3206; C08G 18/4238
See application file for complete search history.

(56) References Cited

U.S. PATENT DOCUMENTS

| | | | |
|---|---|---|---|
| 9,914,287 B2 * | 3/2018 | Renner ............. | C08G 18/4216 |
| 2006/0269758 A1 * | 11/2006 | Helmeke ............. | B32B 27/322 |
| | | | 428/423.1 |
| 2012/0128991 A1 * | 5/2012 | Kollbach ........... | C08G 18/4238 |
| | | | 156/331.7 |
| 2020/0407611 A1 * | 12/2020 | Wu ...................... | C08G 18/246 |

FOREIGN PATENT DOCUMENTS

JP             09324167 A    * 12/1997

OTHER PUBLICATIONS

JP-09324167_Miyatat>Dec. 1997_English.*

* cited by examiner

*Primary Examiner* — Michael L Leonard
(74) *Attorney, Agent, or Firm* — ArentFox Schiff LLP

(57) ABSTRACT

The present disclosure provides a two-component polyurethane adhesive composition and a bonding method thereof. The two-component polyurethane adhesive composition includes A) a polyol component, and B) an isocyanate component. The polyol component includes A1) one or more polyether polyols, and the isocyanate component includes B1) a first isocyanate prepolymer, wherein the first isocyanate prepolymer is polymerized from isocyanate and a non-linear chain extender. The two-component polyurethane adhesive composition of the present disclosure has good mechanical properties, in particular, high G modulus and high elongation. The polyol component in the two-component polyurethane adhesive composition has good phase stability, and good miscibility with the isocyanate component. The two-component polyurethane adhesive composition of the present disclosure can be used for the production and manufacture of mechanical parts such as automobile components.

18 Claims, No Drawings

TWO-COMPONENT POLYURETHANE ADHESIVE COMPOSITION AND BONDING METHOD THEREOF

CROSS-REFERENCE TO RELATED APPLICATION

This application is a 371 U.S. national stage of PCT/CN2019/122996, filed Dec. 4, 2019, the contents of which are incorporated herein by reference.

TECHNICAL FIELD

The present disclosure relates to the field of two-component polyurethane (2K PU) compositions, more particularly, to a structural two-component polyurethane adhesive. Such type of 2K PU adhesive is mainly used in the automobile industry.

BACKGROUND ART

For a long time, the 2K PU adhesive has been mainly used in the automobile industry for fastening panels, tailgates, roof modules, spoilers and decoration components.

Nowadays, it is desirable to reduce the weight of vehicles so as to save fuel and improve vehicle performances. The development of electric vehicles accelerates such trend. In order to reduce the weight of vehicles, it is necessary in most cases to use different structural materials in combination. Metal parts are replaced by plastic materials with a lighter weight. Combinations of metals such as aluminum, steel and magnesium are also used. Various combinations of plastics and metals are also possible. Carbon fiber reinforced plastic (CFRP) is becoming increasingly important. CFRP parts not only can be combined with other CRFP parts, but also can be combined with other structural materials. It is difficult to bond structural materials having different linear expansion coefficients. As mechanical fixing is no longer feasible, specially developed adhesives need to be used in instead, and the 2K PU adhesive is also workable. A bonding process of the 2K PU adhesive can also be simplified by automation. This requires the 2K PU adhesive to have a relatively long open time of 3 to 5 minutes, and demands acceleration of curing by a mechanical or thermal treatment method.

The polyol component of the 2K PU adhesive is mainly based on medium chain polyols having 2-4 propylene oxide (PO) per OH group and high functionality of F=3-6 (the number of OH groups per molecule).

Researchers found that these kinds of polymers exhibit an amorphous structure with a glass transition temperature (Tg) between −10° C. and 80° C., which is within a use temperature range for automobile applications. At such glass transition temperatures, the stiffness and mechanical strength of such adhesives may decrease by tens of orders of magnitude. This renders the adhesives at least unsuitable for semi-structured and structured applications.

In order to cope with different polymer morphology techniques with temperature/mechanical property dependency problems, elastomeric structures with hard segments and soft segments are used in place of amorphous polymers. In this technique, miscibility and phase separation play an important role.

Rheological property is another important characteristic of the 2K PU adhesive. The adhesive should exhibit non-sagging property. Once the adhesive is affixed to a substrate, its position and shape should be maintained. It has been found that when a primary-amine-group-containing compound, such as polyoxypropylene diamine or polyoxypropylene triamine, is added to a polyol component, and then they are mixed with an isocyanate component, a sagging-resistant paste will be generated immediately.

The open time and curing rate of the 2K PU adhesive are other key properties. Long open time and subsequent rapid curing are required. In most cases, thermally initiated accelerated curing may be employed. A heat source may be applied by means of shock heating, infrared radiation, induction or microwaves. A catalyst combination used also plays an important role, and catalysts with delaying effect are preferred.

The stiffness of the adhesive is represented by G modulus/E modulus. In an elastomeric PU structure, the stiffness can be improved by adding hard segments. The increasing of hard segments can be obtained by increasing the content of chain extender and thus the content of polyisocyanate. The solubility of the chain extender in the polyol component and in the mixture of two components is a factor that limits the phase stability of the polyol component as well as the miscibility and phase separation of the two components. However, although some chain extenders can improve the phase separation, they have too high solubility, thus resulting in relatively low mechanical performance and relatively low Tg.

It has been found that it is infeasible to incorporate a linear chain extender into the isocyanate component. A reaction product of isocyanate and a linear chain extender is crystalline, and may result in increasing the viscosity of a prepolymer and even forming a paste.

Therefore, it is a great challenge to develop a two-component polyurethane adhesive having good mechanical properties, in particular, high G modulus and high elongation.

SUMMARY OF THE INVENTION

Objects of the present disclosure include, for example, providing a two-component polyurethane adhesive composition that simultaneously has high strength performance, high stiffness and high ductility. The temperature dependence of the adhesive on the G modulus should also be very small.

The present disclosure provides a two-component polyurethane adhesive composition, including:

A) a polyol component,
the polyol component including A1) one or more polyether polyols; and
B) an isocyanate component,
the isocyanate component including B1) a first isocyanate prepolymer,
wherein the first isocyanate prepolymer is polymerized from isocyanate and a non-linear chain extender.

In one or more embodiments, the non-linear chain extender has a molecular weight less than 250 daltons.

In one or more embodiments, the non-linear chain extender is at least one selected from the group consisting of propylene glycol, dipropylene glycol, tripropylene glycol and tetrapropylene glycol.

In one or more embodiments, the first isocyanate prepolymer is 2-8%, for example, 3-7%, 4-6% or 2-8%, of the isocyanate component by weight.

In one or more embodiments, at least one of the polyol component and the isocyanate component further includes a crystalline polyester polyol.

In one or more embodiments, the crystalline polyester polyol is copolymerized from linear dicarboxylic acid having an even number of carbon atoms and linear diol having an even number of carbon atoms.

In one or more embodiments, the linear dicarboxylic acid having an even number of carbon atoms is at least one selected from the group consisting of succinic acid, adipic acid, suberic acid and sebacic acid.

In one or more embodiments, the linear diol having an even number of carbon atoms is at least one selected from the group consisting of 1,2-ethanediol, 1,4-butanediol, 1,6-hexanediol and 1,8-octanediol.

In one or more embodiments, the crystalline polyester polyol has a molecular weight of 2000-8000 daltons.

In one or more embodiments, the one or more polyether polyols in the polyol component are at least one selected from the group consisting of homopolymer of propylene oxide and copolymer of propylene oxide and ethylene oxide.

In one or more embodiments, the copolymer of propylene oxide and ethylene oxide is a copolymer of 80-99% propylene oxide and 1-20% ethylene oxide.

In one or more embodiments, an OH equivalent of the one or more polyether polyols is 400-2000 g/mol.

In one or more embodiments, the one or more polyether polyols have a functionality of 2-4.

In one or more embodiments, the one or more polyether polyols are 30-60%, for example, 35-55%, 40-50% or 43-47%, of the polyol component by weight.

In one or more embodiments, the polyol component further includes A2) an aliphatic chain extender.

In one or more embodiments, the aliphatic chain extender is linear.

In one or more embodiments, the aliphatic chain extender is at least one selected from the group consisting of ethylene glycol, 1,4-butanediol and 1,6-hexanediol.

In one or more embodiments, an OH equivalent of the aliphatic chain extender is not greater than 200 g/mol.

In one or more embodiments, the aliphatic chain extender is 2-15%, for example, 4-13%, 5-10% or 6-8%, of the polyol component by weight.

In one or more embodiments, the polyol component further includes A3-1) an organometallic catalyst.

In one or more embodiments, the organometallic catalyst is a catalyst having a property of delaying reaction.

In one or more embodiments, the organometallic catalyst is a tin-mercapto compound, for example, at least one selected from the group consisting of dialkyltin mercaptides and dialkyltin thioglycolates.

In one or more embodiments, the organometallic catalyst is 0.03-1%, for example, 0.03-1%, 0.3-0.8% or 0.4-0.6%, of the polyol component by weight.

In one or more embodiments, the polyol component further includes A3-2) an amine catalyst.

In one or more embodiments, the amine catalyst has a property of delaying reaction.

In one or more embodiments, the amine catalyst is at least one selected from the group consisting of diazabicycloundecene catalysts that block acid, and a reaction product of glycerol and diazabicyclooctane.

In one or more embodiments, the amine catalyst is 0.05-1%, for example 0.1-0.8%, 0.3-0.7%, or 0.4-0.6%, of the polyol component by weight.

In one or more embodiments, the polyol component further includes A4) a particulate filler.

In one or more embodiments, the particulate filler is an inorganic mineral filler. In one or more embodiments, the particulate filler is at least one selected from the group consisting of calcium carbonate, talc, kaolin, clay, quartz, fly ash, carbon black and fumed silica.

In one or more embodiments, the particulate filler has a particle size of 100 nm-100 μm, for example, 1 μm-10 μm.

In one or more embodiments, the particulate filler is 10-60%, for example, 20-50%, 25-45% or 30-40%, of the polyol component by weight.

In one or more embodiments, the polyol component further includes A5) polyetheramine.

In one or more embodiments, the polyetheramine at least has two primary or secondary amine groups.

In one or more embodiments, the polyetheramine is at least one selected from the group consisting of Jeffamine D-400 and Jeffamine T-403.

In one or more embodiments, the polyetheramine is 0-5%, for example, 1-4%, 1.5-3.5% or 2-3%, of the polyol component by weight.

In one or more embodiments, the polyol component further includes A6) a crystalline polyester polyol.

In one or more embodiments, the crystalline polyester polyol has a molecular weight of 2000-8000 daltons.

In one or more embodiments, the crystalline polyester polyol is copolymerized from linear dicarboxylic acid having an even number of carbon atoms and linear diol having an even number of carbon atoms.

In one or more embodiments, the linear dicarboxylic acid having an even number of carbon atoms is at least one selected from the group consisting of succinic acid, adipic acid, suberic acid and sebacic acid.

In one or more embodiments, the linear diol having an even number of carbon atoms is at least one selected from the group consisting of 1,2-ethanediol, 1,4-butanediol, 1,6-hexanediol and 1,8-octanediol.

In one or more embodiments, the crystalline polyester polyol is 0-10%, for example, 1-8%, 2-7% or 3-5% of the polyol component by weight.

In one or more embodiments, the isocyanate component further includes B2) a second isocyanate prepolymer, and the second isocyanate prepolymer is polymerized from isocyanate and crystalline polyester polyol.

In one or more embodiments, the crystalline polyester polyol has a molecular weight of 2000-8000 daltons.

In one or more embodiments, the crystalline polyester polyol is copolymerized from linear dicarboxylic acid having an even number of carbon atoms and linear diol having an even number of carbon atoms.

In one or more embodiments, the linear dicarboxylic acid having an even number of carbon atoms is at least one selected from the group consisting of succinic acid, adipic acid, suberic acid and sebacic acid.

In one or more embodiments, the linear diol having an even number of carbon atoms is at least one selected from the group consisting of 1,2-ethanediol, 1,4-butanediol, 1,6-hexanediol and 1,8-octanediol.

In one or more embodiments, the crystalline polyester polyol is 0-10%, for example, 1-8%, 2-7% or 3-5%, of the isocyanate component by weight.

In one or more embodiments, the isocyanate component further includes B3) a third isocyanate prepolymer, and the third isocyanate prepolymer is polymerized from isocyanate and polyether polyol.

In one or more embodiments, an isocyanate equivalent (NCO equivalent) of the third isocyanate prepolymer is greater than 800 g/mol.

In one or more embodiments, the third isocyanate prepolymer has a molecular weight of 1600-8000.

In one or more embodiments, the third isocyanate prepolymer is 0-60%, for example, 10-50%, 20-45% or 30-40%, of the isocyanate component by weight.

In one or more embodiments, the isocyanate component further includes B4) a non-prepolymeric isocyanate.

In one or more embodiments, an NCO equivalent of the non-prepolymeric isocyanate is 125-200 g/mol.

In one or more embodiments, the non-prepolymeric isocyanate is at least one selected from the group consisting of pure MDI, polymeric MDI, and modified MDI incorporated with carbodiimide, uretonimine, isocyanurate, carbamate, allophanate and urea and/or biuret groups.

In one or more embodiments, the non-prepolymeric isocyanate is 20-50%, for example, 30-45%, 35-40% or 37-39%, of the isocyanate component by weight.

In one or more embodiments, the isocyanate component further includes B5) an aliphatic isocyanate.

In one or more embodiments, the aliphatic isocyanate includes 2 isocyanate groups.

In one or more embodiments, the aliphatic isocyanate is at least one selected from the group consisting of 4,4-dicyclohexylmethane diisocyanate such as Desmodur W, hexamethylene diisocyanate such as Desmodur H and isophorone diisocyanate such as Desmodur I.

In one or more embodiments, the aliphatic isocyanate is 0-8%, for example, 1-7%, 2-6% or 3-5%, of the isocyanate component by weight In one or more embodiments, the isocyanate component further includes B6) a particulate filler.

In one or more embodiments, the particulate filler is an inorganic mineral filler. In one or more embodiments, the particulate filler is at least one selected from the group consisting of calcium carbonate, talc, kaolin, clay, quartz, fly ash, carbon black and fumed silica.

In one or more embodiments, the particulate filler has a particle size of 100 nm-100 μm, for example, 1 μm-10 μm.

In one or more embodiments, the particulate filler is 10-60%, for example, 20-50%, 25-45% or 30-40%, of the isocyanate component by weight.

In one or more embodiments, the isocyanate component further includes B7) a plasticizer.

In one or more embodiments, the plasticizer is selected from alkyl sulfonate; diisooctyl phthalate (DIOP), diisodecyl phthalate (DIDP), diisononyl phthalate (DINP); and one or two of tricresyl phosphate and trioctyl phosphate. More preferably, the plasticizer is at least one selected from the group consisting of diisooctyl phthalate (DIOP), diisodecyl phthalate (DIDP), and diisononyl phthalate (DINP).

In one or more embodiments, the plasticizer is 0-30%, for example, 5-25%, 10-20% or 13-17%, of the isocyanate component by weight.

In one or more embodiments, the first isocyanate prepolymer, the second isocyanate prepolymer and the third isocyanate prepolymer are synthesized in situ, or obtained by first separately preparing respective prepolymers and then mixing them.

In one or more embodiments, a ratio of the A) polyol component to the B) isocyanate component is 1:2 to 10:1, preferably, 1:2 to 5:1, more preferably, 1:2 to 2:1, for example, 1:1.

The present disclosure provides an adhesive product, including:
 at least two substrates, and
 a cured product of the two-component polyurethane adhesive composition in the present disclosure that bonds the at least two substrates together.

In one or more embodiments, the adhesive product is a mechanical part, for example, an automobile component.

The present disclosure provides a method for bonding at least two substrates, including:
 curing a mixture of A) a polyol component and B) an isocyanate component of the two-component polyurethane adhesive in the present disclosure between the at least two substrates.

In one or more embodiments, the curing is performed at least partially in a following manner: shock heating, infrared radiation, induction or microwave heating.

In one or more embodiments, the method includes curing the mixture of A) a polyol component and B) an isocyanate component of the two-component polyurethane adhesive at a bond line between the two substrates.

DETAILED DESCRIPTION OF INVENTION

In order to make the objects, technical solutions and advantages of the embodiments of the present disclosure clearer, the technical solutions in the embodiments of the present disclosure will be described below clearly and completely. If no specific conditions are specified in the embodiments, they are carried out under normal conditions or conditions recommended by manufacturers. If the manufacturers of reagents or apparatus used are not specified, they are conventional products commercially available.

Unless otherwise defined herein, scientific and technical terms used in the present disclosure should have meanings that are commonly understood by those ordinarily skilled in the art. Exemplary methods and materials are described below, but methods and materials similar or equivalent to those described herein can also be used in the practice or test of the present disclosure.

The term "functionality" or "polymer functionality" as used herein can be used interchangeably to refer to the number of functional groups in a molecule that can participate in a reaction. Common functional groups include, for example, —OH, —COOH, and —NH$_2$.

The term "hydroxyl equivalent" or "OH equivalent" as used herein can be used interchangeably to refer to the mass (g) of a compound (e.g., polyether polyol, chain extender) containing 1 mol of hydroxyl group or OH. For example, the polyether polyol having an OH equivalent of 300 to 3000 g/mol means that the polyether polyol containing 1 mol of hydroxyl group has a mass of 300 to 3000 g.

Similarly, the term "isocyanate equivalent" as used herein refers to the mass (g) of a compound (e.g., prepolymer) containing 1 mol of isocyanate.

The present disclosure provides a two-component polyurethane adhesive composition, including:
 A) a polyol component, and
 B) an isocyanate component.

In one or more embodiments, the polyol component includes A1) one or more polyether polyols.

In one or more embodiments, the isocyanate component includes B1) a first isocyanate prepolymer.

In one or more embodiments, the first isocyanate prepolymer is polymerized from isocyanate and a non-linear chain extender.

In one or more embodiments, main ingredients of the polyol component include one or more of the following:

A1) A polyether polyol or a mixture of polyether polyols. The OH equivalent of such polyether polyol is 300-3000 g/mol. Each polyether polyol has a nominal functionality of 2-4 (the number of OH groups/molecule). By-products produced in the propoxylation process may cause reduction in the actual function.

The polyether polyol may be a homopolymer of propylene oxide (PO) or a copolymer of propylene oxide and ethylene oxide (10-30%). The ethylene oxide may be randomly distributed in the polyol, or may be added (capped) at an end of a chain. The polyols containing ethylene oxide (EO) have better compatibility with polar chain extenders and isocyanate. They are preferably used in mixture with PO homopolymer alone.

Other polyether polyols, for example, PO/EO/SAN-copolymer polyols or polytetrahydrofuran polyols, can be used alone or in mixture with PO/EO polyether polyol.

The polyether polyol accounts for 30 to 60 wt % of the polyol component.

A2) Linear aliphatic diol chain extenders or aromatic chain extenders having two isocyanate reactive groups with a molecular weight of 60 to 300, examples including ethylene glycol, 1,4-butanediol, 1,6-hexanediol, bisphenol A, and bisphenol-PO adducts. Non-linear chain extenders also can be used alone or in mixture, and examples include 2-methyl-1,3-propanediol, 3-methyl-1,3-butanediol, 2-methyl-2,4-pentanediol, and 2-ethyl-1,3-hexanediol.

The chain extender accounts for 3 to 25 wt % of the polyol component.

In another embodiment of the present disclosure, an OH-group-containing compound having a functionality of 3 to 4 (the number of OH groups) and a low molecular weight is used in place of the chain extender. Examples include glycerol, trimethylolpropane, pentaerythritol, and polyether polyols based on these compounds having an average chain length of 1 to 2, preferably 1 to 1.3, PO or EO/OH. A very high G modulus can be obtained, and the extension/ductility remains in an acceptable range of 30 to 60%.

A3) An amine catalyst, an organometallic catalyst or a mixture of catalysts. Standard commercially available amine catalysts, such as 1,4-diazabicyclo [2.2.2] octane (DABCO) and organometallic catalysts, such as tin dimethylcarboxylate, can be used.

In order to obtain better workability, catalysts having the delaying effect and property are preferred. Preferable amine catalysts having the delaying effect are blocked catalysts based on diazo-bicycloundecene (DBU-salt), and examples are 1,8-diaza[5.4.0]-undec-7-ene compounds. Examples of preferred organometallic catalysts are tin-mercapto compounds, for example, dialkyltin mercaptides or dialkyltin thioglycolates.

Another embodiment of the amine catalyst having the delaying effect according to the present disclosure is using DABCO/glycerol complex. It was found that reaction of DABCO and glycerol can form a complex, thereby resulting in the property of delaying the catalytic effect.

A4) At least one particulate filler. The particulate filler is solid and insoluble in the polyol component. The particle size of the filler is 100 nm to 100 μm. A preferred particle size is 1 μm to 10 μm. Particulate fillers typically are inorganic minerals, for example, calcium carbonate, talc, kaolin, clay, quartz, fly ash, carbon black and fumed silica. Fibrous fillers such as wollastonite, or organic plastic fillers are also possible. As a filler, carbon black exhibits quite interesting properties, as it improves the rheological and mechanical properties of the adhesive.

The particulate filler accounts for 10 to 60 wt % of the polyol component.

A5) Polyetheramine. In one or more embodiments, the polyetheramine has at least two primary or secondary amine groups, for example, the polyetheramine is at least one selected from the group consisting of polyoxypropylene diamines such as Jeffamine D-400 and polyoxypropylene triamines such as Jeffamine T-403. In one or more embodiments, the polyetheramine is 0-5% of the polyol component by weight.

A6) Crystalline polyester polyol. The crystalline polyester polyol is copolymerized from linear dicarboxylic acid having an even number of carbon atoms and linear diol having an even number of carbon atoms, and has an equivalent of 1000-4000 g/mol. Examples of the linear dicarboxylic acids having an even number of carbon atoms are succinic acid, adipic acid, suberic acid and sebacic acid. The linear diol having an even number of carbon atoms is selected from the group consisting of 1,2-ethanediol, 1,4-butanediol, 1,6-hexanediol and 1,8-octanediol.

The crystalline polyester polyol accounts for 0-10 wt % of the polyol component.

In one or more embodiments, the polyol component may additionally include rheologically active additives, for example, fumed silica or other processing aids, for example, drying agents, for example molecular sieves, wetting agents, stabilizers, colorants.

In one or more embodiments, main ingredients of the isocyanate component include one or more of the following:

B1-4) One or more isocyanate compounds.

In one or more embodiments, the isocyanate compound includes a first isocyanate prepolymer polymerized from isocyanate and a non-linear chain extender. In one or more embodiments, the non-linear chain extender is at least one selected from the group consisting of propylene glycol, dipropylene glycol, tripropylene glycol and tetrapropylene glycol.

In one or more embodiments, the isocyanate compound includes a second isocyanate prepolymer polymerized from isocyanate and crystalline polyester polyol. In one or more embodiments, the crystalline polyester polyol has a molecular weight of 2000-8000 daltons. In one or more embodiments, the crystalline polyester polyol is copolymerized from linear dicarboxylic acid having an even number of carbon atoms and linear diol having an even number of carbon atoms. In one or more embodiments, the linear dicarboxylic acid having an even number of carbon atoms is at least one selected from the group consisting of succinic acid, adipic acid, suberic acid and sebacic acid. In one or more embodiments, the linear diol having an even number of carbon atoms is at least one selected from the group consisting of 1,2-ethanediol, 1,4-butanediol, 1,6-hexanediol and 1,8-octanediol. In one or more embodiments, the crystalline polyester polyol is 0-10% of the isocyanate component by weight.

In one or more embodiments, the isocyanate compound includes an isocyanate-capped third isocyanate prepolymer, having at least two isocyanate groups per molecule, and an isocyanate equivalent of greater than 800 g/mol, and a molecular weight of 1600-8000. The third isocyanate prepolymer is 0-60% of the isocyanate component by weight.

In one or more embodiments, the isocyanate compound includes non-prepolymeric isocyanates. These isocyanate components are added specifically or in a stoichiometric excess per se in the prepolymer preparation step. In one or more embodiments, the non-prepolymeric isocyanate has an isocyanate equivalent of 125-200 g/mol. In one or more embodiments, the non-prepolymeric isocyanate is at least one selected from the group consisting of pure MDI, polymeric MDI, and modified MDI incorporated with carbodiimide, uretonimine, isocyanurate, carbamate, allophanate and urea and/or biuret groups. In one or more embodiments, the non-prepolymeric isocyanate is 20-50% of the isocyanate component by weight.

The isocyanate compound accounts for 10 to 70 wt %, more preferably 30 to 60 wt %, of the isocyanate component.

The isocyanate-capped isocyanate prepolymer may be one or more reaction products of one or more aromatic polyisocyanates having a molecular weight of 200 to 1600 and an average functionality of 2.0 to 2.8. The isocyanate-capped isocyanate prepolymer further contains:

a) A homopolymer of propylene oxide (PO) or a copolymer of propylene oxide and ethylene oxide (an EO content of 10-30%), with a nominal functionality of 2 to 4. The molecular weight is 1000 to 6000.

Other polyether polyols, for example, PO/EO/SAN-copolymer polyol or polytetrahydrofuran polyol, can be used alone or in mixture with PO/EO polyether polyol.

b) Short-chain, low-molecular-weight, non-linear chain extenders/crosslinkers. The chain extenders/crosslinkers include propylene glycol, dipropylene glycol, tripropylene glycol, tetrapropylene glycol, trimethylolpropane, pentaerythritol, glycerol, or PO/EO adducts of trimethylolpropane, pentaerythritol, and glycerol with a chain length of 1 to 2 PO or EO/OH.

The isocyanate for preparing the prepolymer may be any commercially available isocyanate with a low equivalent, or a mixture of two or more therefrom.

The isocyanate groups of the isocyanates may be aromatic, aliphatic or cycloaliphatic.

The isocyanate groups of the isocyanate prepolymer are predominantly aromatic, making up >70%.

For example, the aromatic isocyanate is MDI (pure) or PMDI (polymeric MDI) or modified MDI incorporated with carbodiimide, uretonimine, isocyanurate, carbamate, allophanate or urea and/or biuret groups.

For example, the aliphatic isocyanates include cyclohexane diisocyanate, bis(isocyanatomethyl) cyclohexane, methylcyclohexane diisocyanate, methylenebicyclohexane diisocyanate, isophorone diisocyanate and hexamethylene diisocyanate.

The isocyanate prepolymers of the isocyanate component may be reacted separately and blended, or reaction can be performed by a mixture of some or all of the reactants.

B5) An aliphatic isocyanate component. In one or more embodiments, the aliphatic isocyanate contains 2 isocyanate groups. In one or more embodiments, the aliphatic isocyanate is at least one selected from the group consisting of 4,4-dicyclohexylmethane diisocyanate such as Desmodur W, hexamethylene diisocyanate such as Desmodur H and isophorone diisocyanate such as Desmodur I. In one or more embodiments, the aliphatic isocyanate is 0-8% of the isocyanate component by weight.

B6) Particulate filler. In one or more embodiments, the filler can be of a mineral type, for example, calcium carbonate, talc, kaolin, clay, quartz, fly ash, carbon black and fumed silica.

The particulate filler accounts for 10-60% of the isocyanate component.

B7) Plasticizer. In one or more embodiments, the plasticizer may be alkyl sulfonate; diisooctyl phthalate (DIOP), diisodecyl phthalate (DIDP), diisononyl phthalate (DINP); one or two of tricresyl phosphate and trioctyl phosphate. More preferably, the plasticizer is at least one of diisooctyl phthalate (DIOP), diisodecyl phthalate (DIDP), and diisononyl phthalate (DINP).

The plasticizer accounts for 0-30 wt % of the isocyanate component.

In one or more embodiments, the isocyanate component may additionally include one or more other ingredients, for example, stabilizers, processing aids and processing aids. Examples include metal catalysts, benzoyl chloride, phosphoric acid, plasticizers, fumed silica and wetting agents.

In one or more embodiments, the polyol component and the isocyanate component are preferably formulated at a designed volumetric mixture ratio of 1:1 or 2:1. Other mixture ratios are also possible. The isocyanate is stoichiometrically excess according to the designed volumetric mixture ratio. "Excess" is measured by the term "isocyanate index", and is calculated by dividing the number of isocyanate groups in the isocyanate component by the total number of isocyanate-reactive groups in the polyol component. The excess isocyanate groups serve to covalently bond to the substrate so as to improve the adhesivity, especially under aging conditions. Preferred isocyanate indices are 1.05 to 1.8 or more preferably 1.05 to 1.5. (Isocyanate index=stoichiometric ratio in which total isocyanate equivalent is divided by an isocyanate reactivity equivalent).

The present disclosure includes a method of bonding two substrates, including mixing a polyol component and an isocyanate component in a designed ratio to form a mixed adhesive. The mixed adhesive forms an adhesive layer between the two substrates and contacts with the two substrates. A contact surface of the substrates may be pretreated with an adhesion promoter, a primer or machinery, flame, corona. The adhesive layer is cured between the substrates so as to form a cured adhesive layer. The adhesive layer has a thickness of 0.1 mm to 10 mm, preferably 1.0 mm to 3.0 mm.

Metering and mixing of the two components can be accomplished using different equipment. Metering can be completed by pushing the components out of a hard rubber tube simultaneously with the aid of a glue gun. The mixing process can be carried out with the aid of a static or dynamic mixer. Under industrial conditions, a device capable of performing metering, mixing and construction automatically is preferred.

In application, a preferred temperature of the assembly is 20 to 25° C. Other application temperatures also may achieve specific curing properties. The adhesive will react at room temperature without application of external heat. The open time at room temperature is >5 minutes, preferably >10 minutes.

If rapid curing is desired after application of the adhesive, externally accelerated curing is required by means of a heat source, for example, contact heat, shock heating, infrared, induction, microwave and ultrasonic wave. A bonding temperature of 80 to 100° C. can be reached in 20 seconds to 2 minutes. A curing temperature of <120° C. is desired so as to avoid formation of void or occurrence of thermal degradation. Accelerated curing is also only required to use in part of the bond line. In this way, the two bonded substrates are fixed to processing strength, and the part of remaining adhesive along the bond line can be cured at ambient temperature. The length of the heating time depends on the heating technique and the material condition and construction condition under which the adhesive must be cured. The heating time may be as short as 5 seconds, but may be up to 120 seconds. As an example, when induction heating is performed on the substrate on two sides, the required heating time is about 30 seconds.

The material type of the substrates is not limited, and may be metal, for example, steel, aluminum, magnesium and metal alloys, or a plastic material or a fiber reinforced plastic. Plastic materials reinforced with glass fibers, carbon fibers and polymer fibers are of particular interest. Other substrates, for example, ceramic, glass, cardboard, wood and other construction materials are also possible.

In research and development work, it has been found that incorporating a non-linear chain extender having aliphatic side chains into a prepolymer of the isocyanate component does not form a crystalline prepolymer, and thus no paste is generated. Typical examples are mono-, di-, tri-, tetra-propylene glycol. A small amount of polyols (<2%) with a maximum chain length of 1.5 PO/OH (f=3-4) can also be used.

Using the non-linear chain extender in the isocyanate component can enable hard segments and soft segments of the polymer to remain well separated, thereby maintaining a high glass transition temperature of the hard segments, which effect is still quite significant even the non-linear chain extender is added at a low content. The use of linear chain extender in the polyol component in combination with the addition of non-linear chain extender in the isocyanate component can generate a large amount of hard segments, thereby resulting in a high G-modulus/E-modulus and a wide range of G-modulus/E-modulus. Such practice unexpectedly improves the mechanical properties, for example, G modulus, tear strength, tensile strength, and the extension/elongation property is maintained or even improved. In addition, this composition enables the polyol component to have good phase stability, and good miscibility with the isocyanate component.

In addition, the addition of polyester polyol can provide better thixotropy and storage property to the two-component polyurethane adhesive product. The effect of the various components on the phase separation of the two components.

Illustrative Examples

The following examples are provided to illustrate the present disclosure, but are not intended to limit the scope thereof. All parts and percentages are measured by weight, unless otherwise indicated.

For all examples, the polyol component and the isocyanate component are prepared by mixing ingredients shown in the table. Mixing is carried out in a planetary mixer under vacuum, so as to prevent introduction of air and moisture. In all cases, the polyol component and the isocyanate component are charged into a hard rubber tube.

Another embodiment according to the present disclosure is to add highly crystalline polyester polyols having MW of 1000 to 8000 and being solid at room temperature, for example, they are copolymeric polyester polyols based on adipic acid, suberic acid, sebacic acid/1,4-butanediol, 1,6-hexanediol, and 1,8-octanediol. The polyester polyol is added in an amount of 0 to 10 wt %. It is surprisingly found that the addition of these polyester polyols at low concentration of 0.2-6% avoids the separation of particulate filler or any other ingredients in the polyol component. The same effect can be observed when they are added as a prepolymer to the isocyanate component.

Table 1 to Table 4 show specific components and physical performances of adhesive combinations of respective sub-examples of Examples 1 to 4, respectively. Specific components of catalyst compositions used in the examples are shown in Table 5. Compound names and manufacturers corresponding to trade names of various ingredients are given in Table 6.

TABLE 1

| | | Example 1 | Comparative Example 1-1 | Comparative Example 1-2 | Comparative Example 1-3 | Example 1-4 | Example 1-5 |
|---|---|---|---|---|---|---|---|
| Polymer Ingredient | Polyether component Formulation | A1 mass percentage | A2 mass percentage | A3 mass percentage | A4 mass percentage | A5 mass percentage | |
| | Wanol F3135 | 46.9 | 48.4 | 47.1 | 47.4 | 47.7 | |
| | 1,4-butanediol | 2.8 | 4.8 | 5.2 | 5.2 | 5.2 | |
| | Ethanediol | — | — | — | 0.3 | 0.3 | |
| | Jeffamine D400 | | | | | | |
| | Catalyst A | | | | | | |
| | Catalyst B | 1.2 | 1.2 | 1.2 | 1.2 | 1.2 | |
| | Clay calcined | 47.6 | 44.1 | 45.0 | 43.4 | 43.1 | |
| | Aerosil R202 | 1.5 | 1.5 | 1.5 | 2.5 | 2.5 | |
| | Total polyether component | 100.0 | 100.0 | 100.0 | 100.0 | 100.0 | |
| | Isocyanate component Formulation | B1 mass percentage | B2 mass percentage | B3 mass percentage | B4 mass percentage | B5 mass percentage | |
| | Wannate CDMDI L | 18.2 | 22.5 | 27.5 | — | — | |
| | Wannate MDI-100 | 6.6 | 5.2 | 5.2 | 29.4 | 30.0 | |
| | Propylene glycol | | | | | | |
| | Dipropylene glycol | — | — | — | 1.7 | 2.3 | |
| | Tripropylene glycol | | | | | | |
| | Wanol F3135 | 21.7 | 17.8 | 17.8 | 17.1 | 15.2 | |
| | Wanol C3020 | 16.6 | 12.5 | 12.2 | 11.8 | 10.8 | |
| | DINP | 21.9 | 17.0 | 17.3 | 16.5 | 18.2 | |
| | Carbon black JAZ-1 | 15.0 | 20.0 | 20.0 | 20.0 | 20.0 | |
| | Desmodur N 3300 | — | 5.0 | — | — | — | |
| | Desmodur W | — | — | — | 3.5 | 3.5 | |
| | Total isocyanate component | 100.0 | 100.0 | 100.0 | 100.0 | 100.0 | |
| | NCO content, % | 6.1 | 8.4 | 8.8 | 8.9 | 8.9 | |
| | NCO equivalent | 689 | 500 | 478 | 472 | 472 | |
| | Physical performances | A1 + B1 | A2 + B2 | A3 + B3 | A4 + B4 | A5 + B5 | |
| | Open time, min | 5 | 5 | 6 | 7 | 7 | |
| | Tension-shear strength (1 h, 23°, 50% RH), MPa | 1.8 | 1.1 | 0.5 | 0.7 | 0.8 | |

TABLE 1-continued

|  |  | Example 1 | Example 1-6 | Example 1-7 | Example 1-8 | Example 1-9 |
|---|---|---|---|---|---|---|
| Tension-shear strength (7 d, 23°, 50% RH), MPa | | 6.8 | 8.8 | 8.8 | 12.3 | 12.2 |
| E modulus (7 d, 23°, 50% RH), MPa | | 9.6 | 21.5 | 24.4 | 25.3 | 32.3 |
| G modulus (7 d, 23°, 50% RH), MPa | | 3.1 | 8.2 | 8.8 | 7.2 | 9.0 |
| Elongation at break (7 d, 23°, 50% RH), % | | 220 | 170 | 161 | 350 | 351 |
| Tensile strength (7 d, 23°, 50% RH), MPa | | 8.8 | 13.2 | 12.2 | 11.3 | 12.1 |
| Tear strength (7 d, 23°, 50% RH), N/mm | | 10.3 | 15.7 | 16.6 | 26.1 | 28.1 |

|  |  | Example 1 | Example 1-6 | Example 1-7 | Example 1-8 | Example 1-9 |
|---|---|---|---|---|---|---|
| Polymer Ingredient | Polyether component Formulation | | A6 mass percentage | A7 mass percentage | A8 mass percentage | A9 mass percentage |
| | Wanol F3135 | | 42.3 | 42.3 | 47.4 | 47.7 |
| | 1,4-butanediol | | 10.2 | 10.2 | 5.2 | 5.2 |
| | Ethanediol | | 0.3 | 0.3 | 0.3 | 0.3 |
| | Jeffamine D400 | | 0.1 | 0.1 | | |
| | Catalyst A | | | | 1.2 | 1.2 |
| | Catalyst B | | 1.2 | 1.2 | | |
| | Clay calcined | | 43.4 | 43.4 | 43.4 | 43.1 |
| | Aerosil R202 | | 2.5 | 2.5 | 2.5 | 2.5 |
| | Total polyether component | | 100.0 | 100.0 | 100.0 | 100.0 |
| | Isocyanate component Formulation | | B6 mass percentage | B7 mass percentage | B8 mass percentage | B9 mass percentage |
| | Wannate CDMDI L | | | | — | — |
| | Wannate MDI-100 | | 45.2 | 46.0 | 29.4 | 30.0 |
| | Propylene glycol | | | | | |
| | Dipropylene glycol | | 2.3 | 1.2 | 1.7 | 2.3 |
| | Tripropylene glycol | | | 2.0 | | |
| | Wanol F3135 | | 10.0 | 8.0 | 17.1 | 15.2 |
| | Wanol C3020 | | 18.5 | 18.8 | 11.8 | 10.8 |
| | DINP | | | | 16.5 | 18.2 |
| | Carbon black JAZ-1 | | 20.0 | 20.0 | 20.0 | 20.0 |
| | Desmodur N 3300 | | | | — | — |
| | Desmodur W | | 4.0 | 4.0 | 3.5 | 3.5 |
| | Total isocyanate component | | 100.0 | 100.0 | 100.0 | 100.0 |
| | NCO content, % | | 13.9 | 14.0 | 8.9 | 8.9 |
| | NCO equivalent | | 302 | 300 | 472 | 472 |
| | Physical performances | | A6 + B6 | A7 + B8 | A8 + B8 | A9 + B9 |
| | Open time, min | | 4 | 4 | 3-4 | 3-4 |
| | Tension-shear strength (1 h, 23°, 50% RH), MPa | | 1.1 | 0.9 | 0.4 | 0.5 |
| | Tension-shear strength (7 d, 23°, 50% RH), MPa | | 12.7 | 11.8 | 11.2 | 12.2 |
| | E modulus (7 d, 23°, 50% RH), MPa | | 123.0 | 108.0 | 22.8 | 30.8 |
| | G modulus (7 d, 23°, 50% RH), MPa | | 53.4 | 49.6 | 6.5 | 8.0 |
| | Elongation at break (7 d, 23°, 50% RH), % | | 149 | 172 | 330 | 305 |
| | Tensile strength (7 d, 50% RH), MPa | | 15.4 | 14.6 | 10 | 11.5 |
| | Tear strength (7 d, 23°, 50% RH), N/mm | | 41.0 | 45.0 | 25.0 | 22.0 |

TABLE 2

| | Example 2 | Example 2-1 | Example 2-2 | Example 2-3 | Example 2-4 | Example 2-5 |
|---|---|---|---|---|---|---|
| Polymer Ingredient | Polyether component Formulation | A1 Parts bw | A2 Parts bw | A3 Parts bw | A4 Parts bw | A5 Parts bw |
| | Wanol F3135 | 41.7 | 41.7 | 46.8 | 46.8 | 41.9 |
| | Dynacoll 7380 | | | | | |
| | 1,4-butanediol | 16.0 | 16.0 | | | |
| | Ethanediol | 0.3 | 0.3 | 11.2 | 11.2 | |
| | Trimethylolpropane | | | | | 16.1 |
| | Desmophen 4011T | | | | | |
| | Catalyst A | 1.0 | 1.0 | 1.0 | 1.0 | 1.0 |
| | Clay calcined | 36.0 | 36.0 | 36.0 | 36.0 | 36.0 |
| | Aerosil R 202 | 5.0 | 5.0 | 5.0 | 5.0 | 5.0 |
| | Total polyether component | 100.0 | 100.0 | 100.0 | 100.0 | 100.0 |
| | Phase separation index (1-10)*) | 4 | 4 | 6 | 6 | 8 |
| | Isocyanate component Formulation | B1 Parts bw | B2 Parts bw | B3 Parts bw | B4 Parts bw | B5 Parts bw |
| | Wannate PM 200 | 40.0 | 40.0 | 40.0 | 40.0 | 40.0 |
| | Wannate MDI-100 | 10.0 | 16.0 | 10.0 | 16.0 | 10.0 |
| | Wanol C2020 | 10.0 | | 10.0 | | 10.0 |
| | Dipropylene glycol | | 4.0 | | 4.0 | |
| | Dynacoll 7380 | | | | | |
| | Desmodur W | 6.0 | 6.0 | 6.0 | 6.0 | 6.0 |
| | Clay calcined | 32.0 | 32.0 | 32.0 | 32.0 | 32.0 |
| | Aerosil R 202 | 2.0 | 2.0 | 2.0 | 2.0 | 2.0 |
| | Total isocyanate component | 100.0 | 100.0 | 100.0 | 100.0 | 100.0 |
| | Phase separation index (1-10)*) | 3 | 3 | 3 | 3 | 3 |
| | Physical performances | A1 + B1 | A2 + B2 | A3 + B3 | A4 + B4 | A5 + B5 |
| | Tensile strength (7 d, 23°, 50% RH), MPa | 19.0 | 23.3 | 17.5 | 18 | 14.5 |
| | Elongation at break (7 d, 23°, 50% RH), % | 30.7 | 38 | 30.9 | 30 | 28 |
| | E modulus (7 d, 23°, 50% RH), MPa | 1120 | 1280 | 1101 | 1220 | 1942 |
| | G modulus (7 d, 23°, 50% RH), MPa | 487 | 556 | 479 | 530 | 845 |

| | Example 2 | Example 2-6 | Example 2-7 | Example 2-8 | Example 2-9 |
|---|---|---|---|---|---|
| Polymer Ingredient | Polyether component Formulation | A6 Parts bw | A7 Parts bw | A8 Parts bw | A9 Parts bw |
| | Wanol F3135 | 41.9 | 20.0 | 42.8 | 37.7 |
| | Dynacoll 7380 | | | 4.0 | 4.0 |
| | 1,4-butanediol | | | | 16.0 |
| | Ethanediol | | | 11.2 | 0.3 |
| | Trimethylolpropane | 16.1 | | | |
| | Desmophen 4011T | | 38.0 | | |
| | Catalyst A | 1.0 | 1.0 | 1.0 | 1.0 |
| | Clay calcined | 36.0 | 36.0 | 36.0 | 36.0 |
| | Aerosil R 202 | 5.0 | 5.0 | 5.0 | 5.0 |
| | Total polyether component | 100.0 | 100.0 | 100.0 | 100.0 |
| | Phase separation index (1-10)*) | 8 | 1 | 1 | 1 |
| | Isocyanate component Formulation | B6 Parts bw | B7 Parts bw | B8 Parts bw | B9 Parts bw |
| | Wannate PM 200 | 40.0 | 40.0 | 40.0 | 40.0 |
| | Wannate MDI-100 | 16.0 | 10.0 | 10.0 | 10.0 |
| | Wanol C2020 | | 6.0 | 6.0 | 6.0 |
| | Dipropylene glycol | 4.0 | | | |
| | Dynacoll 7380 | | 4.0 | 4.0 | 4.0 |
| | Desmodur W | 6.0 | 6.0 | 6.0 | 6.0 |
| | Clay calcined | 32.0 | 32.0 | 32.0 | 32.0 |
| | Aerosil R 202 | 2.0 | 2.0 | 2.0 | 2.0 |
| | Total isocyanate component | 100.0 | 100.0 | 100.0 | 100.0 |

TABLE 2-continued

|  |  |  |  |  |
|---|---|---|---|---|
| Phase separation index (1-10)*) | 3 | 1 | 1 | 1 |
| Physical performances | A6 + B6 | A7 + B8 | A8 + B8 | A9 + B9 |
| Tensile strength (7 d, 23°, 50% RH), MPa | 14.5 | 36.9 | 19.5 | 26.3 |
| Elongation at break (7 d, 23°, 50% RH), % | 35 | 10.4 | 33.8 | 33 |
| E modulus (7 d, 23°, 50% RH), MPa | 2020 | 2095 | 1250 | 1200 |
| G modulus (7 d, 23°, 50% RH), MPa | 880 | 910 | 543 | 510 |

*)Phase separation index (after standing for one month at room temperature)/1 = no separation, 10 = apparent separation

TABLE 3

|  | Example 3 | Example 3-1 | Example 3-2 | Example 3-3 | Example 3-4 | Example 3-5 | Example 3-6 |
|---|---|---|---|---|---|---|---|
| Polymer Ingredient | Polyether component | A1 | A2 | A3 | A4 | A5 | A6 |
|  | Formulation | Parts bw | Parts bw | Parts bw | Parts bw | Parts bw | Parts bw |
|  | Wanol F3135 | 47.0 | 47.0 | 47.0 | 47.0 | 47.0 | 47.0 |
|  | 1,4-butanediol | 5.0 | 5.0 | 5.0 | 5.0 | 5.0 | 5.0 |
|  | Jeffamine D400 | 0.6 | 0.6 | 0.6 | 0.6 | 0.6 | 0.6 |
|  | Catalyst B | 0.9 | 0.9 | 0.9 | 0.9 | 0.9 | 0.9 |
|  | Clay calcined | 45.0 | 45.0 | 45.0 | 45.0 | 45.0 | 45.0 |
|  | Aerosil R202 | 1.5 | 1.5 | 1.5 | 1.5 | 1.5 | 1.5 |
|  | Total polyether component | 100.0 | 100.0 | 100.0 | 100.0 | 100.0 | 100.0 |
|  | Isocyanate component | B1 | B2 | B3 | B4 | B5 | B6 |
|  | Formulation | Parts bw | Parts bw | Parts bw | Parts bw | Parts bw | Parts bw |
|  | Wannate CDMDI L | 23.5 |  | 21.8 |  | 22.1 |  |
|  | Wannate MDI-100 | 5.0 | 25.8 | 5.0 | 25.8 | 5.0 | 26.1 |
|  | Wanol C2020 | 11.9 | 12.6 | 12.6 | 12.6 | 13.0 | 13.0 |
|  | Wanol F3135 | 17.0 | 18.0 | 18.0 | 18.0 | 19.1 | 19.1 |
|  | Dipropylene glycol |  | 1.0 |  | 1.0 |  | 1.0 |
|  | DINP | 16.1 | 16.1 | 16.1 | 16.1 | 18.0 | 18.0 |
|  | Carbon black JAZ-1 | 20.0 | 20.0 | 20.0 | 20.0 | 20.0 | 20.0 |
|  | Desmodur N 3400 | 6.5 | 6.5 |  |  |  |  |
|  | Desmodur N 3300 |  |  | 6.5 | 6.5 |  |  |
|  | Desmodur H |  |  |  |  | 2.8 | 2.8 |
|  | Demodur I |  |  |  |  |  |  |
|  | Desmodur W |  |  |  |  |  |  |
|  | Total isocyanate component | 100.0 | 100.0 | 100.0 | 100.0 | 100.0 | 100.0 |
|  | NCO content, % | 8.48 | 8.41 | 8.48 | 8.41 | 8.5 | 8.45 |
|  | Physical performances | A1 + B1 | A2 + B2 | A3 + B3 | A4 + B4 | A5 + B5 | A6 + B6 |
|  | Open time, min | 4-5 | 4-5 | 4-5 | 4-5 | 5 | 5 |
|  | Tension-shear strength (1 h, 23°, 50% RH), MPa | 0.80 | 0.70 | 0.73 | 0.65 | 0.35 | 0.3 |
|  | Cohesive failure area (24 h, 23°, 50% RH), % | 100 | 100 | 100 | 100 | 100 | 100 |
|  | G modulus (7 d, 23°, 50% RH), MPa | 6.5 | 6.3 | 6.6 | 6.2 | 6.8 | 6.6 |
|  | Elongation at break (7 d, 23°, 50% RH), % | 180 | 225 | 190 | 230 | 343 | 375 |
|  | Tensile strength (7 d, 23°, 50% RH), MPa | 12.1 | 13.0 | 12.1 | 11.2 | 12.6 | 12.6 |
|  | Tear strength (7 d, 23°, 50% RH) N/mm | 10.8 | 12.8 | 12.3 | 13.5 | 16.2 | 19.8 |

TABLE 3-continued

| | Example 3 | | Example 3-7 | Example 3-8 | Example 3-9 | Example 3-10 |
|---|---|---|---|---|---|---|
| Polymer Ingredient | Polyether component Formulation | | A7 Parts bw | A8 Parts bw | A9 Parts bw | A10 Parts bw |
| | Wanol F3135 | | 47.0 | 47.0 | 47.0 | 47.0 |
| | 1,4-butanediol | | 5.0 | 5.0 | 5.0 | 5.0 |
| | Jeffamine D400 | | 0.6 | 0.6 | 0.6 | 0.6 |
| | Catalyst B | | 0.9 | 0.9 | 0.9 | 0.9 |
| | Clay calcined | | 45.0 | 45.0 | 45.0 | 45.0 |
| | Aerosil R202 | | 1.5 | 1.5 | 1.5 | 1.5 |
| | Total polyether component | | 100.0 | 100.0 | 100.0 | 100.0 |
| | Isocyanate component Formulation | | B7 Parts bw | B8 Parts bw | B9 Parts bw | B10 Parts bw |
| | Wannate CDMDI L | | 21.6 | | 21.6 | |
| | Wannate MDI-100 | | 5.0 | 25.6 | 5.0 | 25.6 |
| | Wanol C2020 | | 13.0 | 13.0 | 13.0 | 13.0 |
| | Wanol F3135 | | 18.2 | 18.2 | 17.0 | 17.0 |
| | Dipropylene glycol | | | 1.0 | | 1.0 |
| | DINP | | 18.5 | 18.5 | 19.0 | 19.0 |
| | Carbon black JAZ-1 | | 20.0 | 20.0 | 20.0 | 20.0 |
| | Desmodur N 3400 | | | | | |
| | Desmodur N 3300 | | | | | |
| | Desmodur H | | | | | |
| | Demodur I | | 3.7 | 3.7 | | |
| | Desmodur W | | | | 4.4 | 4.4 |
| | Total isocyanate component | | 100.0 | 100.0 | 100.0 | 100.0 |
| | NCO content; % | | 8.38 | 8.31 | 8.42 | 8.34 |
| | Physical performances | | A7 + B8 | A8 + B8 | A9 + B9 | A10 + B10 |
| | Open time, min | | <4 | <4 | 7 | 7 |
| | Tension-shear strength (1 h, 23°, 50% RH), MPa | | 0.25 | 0.25 | 0.72 | 0.60 |
| | Cohesive failure area (24 h, 23°, 50% RH), % | | 100 | 100 | 100 | 100 |
| | G modulus (7 d, 23°, 50% RH), MPa | | 6.4 | 6.2 | 6.4 | 6.1 |
| | Elongation at break (7 d, 23°, 50% RH), % | | 290 | 335 | 340 | 365 |
| | Tensile strength (7 d, 23°, 50% RH), MPa | | 12.9 | 12.5 | 12.9 | 13.5 |
| | Tear strength (7 d, 23°, 50% RH), N/mm | | 16.8 | 20.1 | 16.8 | 22.0 |

TABLE 4

| Example 4 | Example 4-1 | Example 4-2 | Example 4-3 |
|---|---|---|---|
| Polyether component Formulation | A1 | A1 | A1 |
| Wanol F3135 | 47.7 | 47.7 | 47.7 |
| 1,4-butanediol | 5.2 | 5.2 | 5.2 |
| Ethanediol | 0.3 | 0.3 | 0.3 |
| Catalyst A | 1.2 | | |
| Catalyst B | | 1.2 | |
| Catalyst C | | | 1.2 |
| Clay calcined | 43.1 | 43.1 | 43.1 |
| Aerosil R202 | 2.5 | 2.5 | 2.5 |
| Total polyether component | 100.0 | 100.0 | 100.0 |
| Isocyanate component Formulation | B1 | B2 | B2 |
| Wannate MDI-100 | 30.0 | 30.0 | 30.0 |
| Dipropylene glycol | 2.3 | 2.3 | 2.3 |
| Wanol F3135 | 15.2 | 15.2 | 15.2 |
| Wanol C2020 | 10.8 | 10.8 | 10.8 |
| DINP | 18.2 | 18.2 | 18.2 |
| Carbon black JAZ-1 | 20.0 | 20.0 | 20.0 |
| Desmodur W | 3.5 | 3.5 | 3.5 |
| Total isocyanate component | 100.0 | 100.0 | 100.0 |
| NCO content, % | 8.9 | 8.9 | 8.9 |
| NCO equivalent | 472 | 472 | 472 |
| Physical performances | A1 + B1 | A2 + B2 | A3 + B3 |
| Open time, min | 3-4 | 7 | 6-7 |
| Tension-shear strength (1 h, 23°, 50% RH), MPa | 1.5 | 0.8 | 1.2 |
| Tension-shear strength (7 d, 23°, 50% RH), MPa | 12.2 | 12.2 | 13 |

TABLE 5

| Catalyst | Blend A | Blend B | Blend C |
|---|---|---|---|
| Component | mass percentage | mass percentage | mass percentage |
| DABCO solid | 5.4 | | 5.4 |
| Glycerin | | | 12.7 |
| Polycat SA-1 | | 5.4 | |
| UL 28 | 6.1 | | |
| UL 29 | | 8.4 | 8.4 |
| N-methyl pyrrolidone | 12 | 12 | 12 |
| DINP | 76.5 | 74.2 | 61.5 |
| Total | 100 | 100 | 100 |
| Organic tin content, % | 1.3 | 1.3 | 1.3 |

TABLE 6

Sources of Raw Materials in Examples

| Name of raw material | Property | Manufacturer |
|---|---|---|
| Wanol F 3135 | Polyether, tri-functionality, glycerin as initiator | Wanhua Chemical |
| Wanol C 2020 | Polyether, di-functionality | Wanhua Chemical |
| Wannate PM 200 | Polymeric MDI, with viscosity of about 200 mPa · s | Wanhua Chemical |
| Wannate MDI-100 | Pure MDI | Wanhua Chemical |
| Wannate CDMDI L | Modified MDI, modified with carbodiimide | Wanhua Chemical |
| Desmodur H | Hexamethylene diisocyanate | Covestro |
| Desmodur N3300 | HDI trimer | Covestro |
| Desmodur N3400 | HDI dimmer | Covestro |
| Desmodur I | Isophorone diisocyanate | Covestro |
| Desmodur W | H12MDI, hydrogenated MDI | Covestro |
| Desmophen 4011T | Polyether, tri-functionality, trimethylolpropane as initiator | Covestro |
| Dynacoll 7380 | Polyester polyol based on adipic acid, hexanediol | Evonik |
| Dabco solid | 1,4-diazabicyclo [2.2.2] octane | Evonik |
| Polycat SA-1 | 1,8-diazabicyclo [5.4.0] -undec-7-ene | Evonik |
| Fomrez UL 28 | Dimethyl tin carboxylate | Momentive |
| Fomrez UL29 | Mercapto dioctyl tin | Momentive |
| Carbon black JAZ 1 | Carbon black | Shandong Hui Bai Chuan New Materials Co., Ltd |
| Clay calcined | Kaolin, average particle size of 1.5-2 μm | Burgess Pigment |
| DINP | Diisononyl phthalate | BASF |
| Jeffamine D400 | Polyether amine | Huntsman |

In Example 1, Sub-examples 1-4, 1-5, 1-8, and 1-9 thereof were compared with comparative examples, and the elongation at break and the tear strength were greatly improved with the G modulus and the tensile strength being substantially unchanged. Sub-examples 1-6 and 1-7 thereof were compared with comparative examples, and the G modulus, the tensile strength, and the tear strength were greatly improved with the elongation at break being comparable.

The addition of polyester Dynacoll 7380 in Example 2 greatly reduced the phase separation of the polyether component and the isocyanate component, such that the storage stability of the system was greatly improved. The addition of polyether Desmophen 4011T in 2-7 also could improve the stability of the polyether component, but the elongation at break of the 2K PU adhesive prepared was much reduced.

In Example 3, differences between the sub-examples and the comparative examples are mainly as follows: (1) higher elongation at break and tear strength (improved by about 20%) could be obtained in the reaction system of dipropylene glycol and MDI in isocyanate, compared with Wannate CDMDI 100 L; (2) compared with Desmodur N3300 and Desmodur N3400, elongation and tear strength of the 2K PU adhesive were further improved by the addition of aliphatic isocyanates (Desmodur H, Desmodur I, Desmodur W).

Examples in Example 4 mainly reflected the catalytic system's effect of delaying reaction after the reaction of glycerol and DABCO.

The above-mentioned are merely for preferred embodiments of the present disclosure, and not intended to limit the present disclosure. For one skilled in the art, various modifications and variations may be made to the present disclosure. Any amendments, equivalent replacements, improvements and so on, made within the spirit and principle of the present disclosure, should be covered within the scope of protection of the present disclosure.

INDUSTRIAL APPLICABILITY

The two-component polyurethane adhesive composition of the present disclosure has good mechanical properties, in particular, high G modulus and high elongation. The polyol component in the two-component polyurethane adhesive composition has good phase stability, and good miscibility with the isocyanate component. The two-component polyurethane adhesive composition of the present disclosure can be used for the production and manufacture of mechanical parts such as automobile components.

What is claimed is:

1. A two-component polyurethane adhesive composition, comprising:
A) a polyol component; and
B) an isocyanate component,
wherein
the polyol component comprises A1) one or more polyether polyols;
the isocyanate component comprises B1) a first isocyanate prepolymer; and
the first isocyanate prepolymer is polymerized from isocyanate and a non-linear chain extender,
wherein the polyol component further comprises a crystalline polyester polyol, and the crystalline polyester polyol is copolymerized from a linear dicarboxylic acid and a linear diol, wherein the linear dicarboxylic acid is at least one selected from the group consisting of adipic acid, suberic acid and sebacic acid, and the linear diol is at least one selected from the group consisting of 1,4-butanediol, 1,6-hexanediol and 1,8-octanediol, the crystalline polyester polyol has a molecular weight of 2000-

8000 daltons, and the crystalline polyester polyol is 0.2-6% of the polyol component by weight.

2. The two-component polyurethane adhesive composition according to claim 1, wherein the non-linear chain extender has a molecular weight less than 250 daltons.

3. The two-component polyurethane adhesive composition according to claim 1, wherein the first isocyanate prepolymer is 2-8% of the isocyanate component by weight.

4. The two-component polyurethane adhesive composition according to claim 1,
wherein
one or more polyether polyols in the polyol component is at least one selected from the group consisting of a homopolymer of propylene oxide, and a copolymer of propylene oxide and ethylene oxide,
wherein
the copolymer of propylene oxide and ethylene oxide is a copolymer of 80-99% propylene oxide and 1-20% ethylene oxide;
an OH equivalent of the one or more polyether polyols is 400-2000 g/mol;
the one or more polyether polyols have a functionality of 2-4; and
the one or more polyether polyols are 30-60% of the polyol component by weight.

5. The two-component polyurethane adhesive composition according to claim 1, wherein the polyol component further comprises A2) an aliphatic chain extender,
wherein,
the aliphatic chain extender is linear; and
the aliphatic chain extender is 2-15% of the polyol component by weight.

6. The two-component polyurethane adhesive composition according to claim 1, wherein the polyol component further comprises A3-1) an organometallic catalyst,
wherein,
the organometallic catalyst is a catalyst having a property of delaying reaction; and
the organometallic catalyst is 0.03-1% of the polyol component by weight.

7. The two-component polyurethane adhesive composition according to claim 1, wherein the polyol component further comprises A3-2) an amine catalyst,
wherein,
the amine catalyst has a property of delaying reaction; and
the amine catalyst is 0.05-1% of the polyol component by weight.

8. The two-component polyurethane adhesive composition according to claim 1, wherein the polyol component further comprises A4) a particulate filler,
wherein,
the particulate filler is an inorganic mineral filler;
the particulate filler has a particle size of 100 nm-100 μm; and
the particulate filler is 10-60% of the polyol component by weight.

9. The two-component polyurethane adhesive composition according to claim 1,
wherein the polyol component further comprises A5) polyetheramine,
wherein, the polyetheramine at least has two primary or secondary amine groups; and
the polyetheramine is 1-4% of the polyol component by weight.

10. The two-component polyurethane adhesive composition according to claim 1,
wherein
the isocyanate component further comprises B2) a second isocyanate prepolymer;
the second isocyanate prepolymer is polymerized from isocyanate and a crystalline polyester polyol;
wherein
the crystalline polyester polyol has a molecular weight of 2000-8000 daltons;
the crystalline polyester polyol is copolymerized from a linear dicarboxylic acid having an even number of carbon atoms and a linear diol having an even number of carbon atoms; and
the crystalline polyester polyol is 1.8% of the isocyanate component by weight.

11. The two-component polyurethane adhesive composition according to claim 1,
wherein
the isocyanate component further comprises B3) a third isocyanate prepolymer, and
the third isocyanate prepolymer is polymerized from isocyanate and polyether polyol,
wherein,
an isocyanate equivalent of the third isocyanate prepolymer is greater than 800 g/mol;
the third isocyanate prepolymer has a molecular weight of 2000-6000, and
the third isocyanate prepolymer is 10-50% of the isocyanate component by weight.

12. The two-component polyurethane adhesive composition according to claim 1,
wherein
the isocyanate component further comprises B4) a non-prepolymeric isocyanate,
wherein,
an isocyanate equivalent of the non-prepolymeric isocyanate is 125-200 g/mol;
the non-prepolymeric isocyanate is at least one selected from the group consisting of pure MDI, polymeric MDI, and modified MDI incorporated with carbodiimide, uretonimine, isocyanurate, carbamate, allophanate and urea and/or biuret groups; and
the non-prepolymeric isocyanate is 20-50% of the isocyanate component by weight.

13. The two-component polyurethane adhesive composition according to claim 1,
wherein,
the isocyanate component further comprises B5) an aliphatic isocyanate,
wherein
the aliphatic isocyanate comprises 2 isocyanate groups; and
the aliphatic isocyanate is 1-7% of the isocyanate component by weight.

14. The two-component polyurethane adhesive composition according to claim 1, wherein the isocyanate component further comprises B6) a particulate filler,
wherein,
the particulate filler is an inorganic mineral filler;
the particulate filler has a particle size of 100 nm-100 um; and
the particulate filler is 10-60% of the isocyanate component by weight.

15. The two-component polyurethane adhesive composition according to claim 1,
wherein the isocyanate component further comprises B7) a plasticizer,
wherein,
the plasticizer is at least one selected from the group consisting of alkyl sulfonate, diisooctyl phthalate, diisodecyl phthalate, diisononyl phthalate, tricresyl phosphate and trioctyl phosphate; and
the plasticizer is 5-25% of the isocyanate component by weight.

16. The two-component polyurethane adhesive composition according to 10, wherein the first isocyanate prepolymer and the second isocyanate prepolymer are synthesized in situ, or obtained by first separately preparing respective prepolymers and then mixing them.

17. The two-component polyurethane adhesive composition according to claim 1, wherein a ratio of A) the polyol component to B) the isocyanate component is 1:2 to 10:1.

18. A method for bonding at least two substrates, comprising:
curing, between the at least two substrates, a mixture of A) the polyol component and B) the isocyanate component of the two-component polyurethane adhesive composition according to claim 1.

* * * * *